(12) United States Patent
Bedford (10) Patent No.: US 9,050,760 B2
(45) Date of Patent: Jun. 9, 2015

(54) BLOWN FILM SCANNING METHOD

(71) Applicant: Robert Bedford, Joshua Tree, CA (US)

(72) Inventor: Robert Bedford, Joshua Tree, CA (US)

(73) Assignee: NDC TECHNOLOGIES, INC., Irwindale, CA (US)

( * ) Notice: Subject to any disclaimer, the term of this patent is extended or adjusted under 35 U.S.C. 154(b) by 380 days.

(21) Appl. No.: 13/712,509

(22) Filed: Dec. 12, 2012

(65) Prior Publication Data

US 2013/0154145 A1 Jun. 20, 2013

Related U.S. Application Data

(60) Provisional application No. 61/576,228, filed on Dec. 15, 2011.

(51) Int. Cl.
| | |
|---|---|
| *G06F 17/50* | (2006.01) |
| *B29D 7/01* | (2006.01) |
| *B29C 47/92* | (2006.01) |
| *B29C 47/00* | (2006.01) |

(52) U.S. Cl.
CPC . *B29D 7/01* (2013.01); *B29C 47/92* (2013.01); *B29C 47/0026* (2013.01); *B29C 47/0054* (2013.01)

(58) Field of Classification Search
CPC ....... B29C 47/0026; B29C 47/92; B29D 7/01
See application file for complete search history.

(56) References Cited

U.S. PATENT DOCUMENTS

| | | | |
|---|---|---|---|
| 2,711,480 A | 6/1955 | Friedman | |
| 3,368,007 A | 2/1968 | Palmer | |
| 3,474,160 A | 10/1969 | Doering | |
| 3,775,035 A | 11/1973 | Scotto et al. | |
| 3,988,582 A | 10/1976 | Harman | |
| 4,189,288 A | 2/1980 | Halter | |

(Continued)

FOREIGN PATENT DOCUMENTS

| EP | 1207368 A2 * | 5/2002 |
|---|---|---|
| EP | 1207368 | 10/2007 |

(Continued)

OTHER PUBLICATIONS

International Search Report for PCT/US2012/069691 dated Mar. 27, 2013 (8 pages).

(Continued)

*Primary Examiner* — Galen Hauth
(74) *Attorney, Agent, or Firm* — Denton L. Anderson; Leech Tishman Fuscaldo & Lampl (57) ABSTRACT

A method is provided for measuring and controlling a cumulative physical property, such as the thickness, of a tubular blown film, wherein the tubular blown film is being extruded from a ring-shaped extruder having a plurality of film physical property controllers disposed around the ring-shaped extruder. Where the physical property is thickness, the method includes the steps of (1) collapsing the tubular film to create a two-ply web and slowly rotating the film while taking a plurality of thickness measurements across the two-play web at various sections of the film, (2) calculating initial estimates of the thickness of each section using a first algorithm, (3) refining the initial estimates of the thicknesses of each section by successive iterations using a second algorithm, and (4) optionally adjusting at least one film physical property controller to control the final estimate of the thicknesses of each longitudinal section.

19 Claims, 4 Drawing Sheets

(56) References Cited

U.S. PATENT DOCUMENTS

| | | | |
|---|---|---|---|
| 4,244,897 A | 1/1981 | Moon | |
| 4,246,212 A | 1/1981 | Upmeier et al. | |
| 4,339,403 A | 7/1982 | Upmeier et al. | |
| 4,351,785 A | 9/1982 | Upmeier et al. | |
| 4,358,330 A | 11/1982 | Aronovici | |
| 4,377,540 A | 3/1983 | Cluett et al. | |
| 4,402,656 A | 9/1983 | Schott, Jr. | |
| 4,409,160 A | 10/1983 | Kogo et al. | |
| 4,425,290 A | 1/1984 | Upmeier | |
| 4,551,289 A | 11/1985 | Schwab et al. | |
| 4,966,536 A | 10/1990 | Veit-Holger | |
| 4,978,484 A | 12/1990 | Takashige | |
| 5,202,068 A | 4/1993 | Mayer et al. | |
| 5,468,134 A | 11/1995 | Cree | |
| 2004/0127614 A1 | 7/2004 | Jiang et al. | |
| 2007/0164467 A1 | 7/2007 | Smith et al. | |
| 2007/0260016 A1 | 11/2007 | Best et al. | |
| 2009/0299930 A1* | 12/2009 | Konermann et al. | 706/25 |
| 2011/0006452 A1 | 1/2011 | Bayer | |
| 2011/0112677 A1* | 5/2011 | Franklin | 700/103 |

FOREIGN PATENT DOCUMENTS

| | | |
|---|---|---|
| ES | 2295099 | 4/2008 |
| IT | MI2007A1963 | 11/2007 |

OTHER PUBLICATIONS

U.S. Appl. No. 12/616,515, filed Nov. 11, 2009, Franklin.
The International Search Report and the Written Opinion of the International Searching Authority, date of mailing: Mar. 27, 2013, in International Application No. PCT/US20121069691.

* cited by examiner fig.1 fig.2 fig.3

Fig. 4

SCANNED GAGE MEASUREMENT ARRAY (APPROX 180DEG)
BUCKET # = SCANNER ANGLE (0 ≥ 180 DEG) + DIE ANGLE (AT LEFT WEB EDGE)

| | 40 | 41 | 42 | 43 | ETC | TOP LAYER | 222 | 223 | 224 | 225 |
|---|---|---|---|---|---|---|---|---|---|---|
| | 39 | 38 | 37 | 36 | | BOTTOM LAYER | 229 | 228 | 227 | 226 |

SCANNER PROFILE (FOLDED) GAGE VALUES
ARE COPIED INTO THE 360 DEG ARRAY
SO THAT EACH TOP BUCKET # IS IN
ITS OWN INDEX IN THE 360 DEG ARRAY

FOLDED VAL
ARRAY 1: 360 BUCKETS. EACH BUCKET
CONTAINS THE SUM OF TWO DIE
THICKNESS VALUES. ONE VALUE
IS THE DIE THICKNESS AT ITS OWN
BUCKET. THE OTHER VALUE IS THE DIE THICKNESS
AT THE OPPOSITE BUCKET. OWN BUCKET VALUE IS
SHOWN AT THE TOP FOR CONVENIENCE.

OWN BKT

| 0 | ETC | 36 | 37 | 38 | 39 | 40 | 41 | 42 | 43 | ETC | TOP LAYER | 222 | 223 | 224 | 225 | 226 | 227 | 228 | 229 | ETC | 359 |
|---|---|---|---|---|---|---|---|---|---|---|---|---|---|---|---|---|---|---|---|---|---|
| 79 | | | | | | 39 | 40 | | | | BOTTOM LAYER | | | | 226 | 225 | 224 | 223 | 222 | | 92 |

OPP BKT

FOLDEDVAL[BKT] =
BBLVAL[BKT] + BBLVAL[OPPBKT]

THE REST OF THE ARRAY IS ASSIGNED
SO THAT EACH BOTTOM BUCKET # (FROM THE SCAN ARRAY)
IS IN ITS OWN INDEX IN THE 360 ARRAY

ONCE THIS IS DONE THERE ARE A FEW SMALL GAPS IN THE 360 DEGREE ARRAY
THESE GAPS ARE LINEARLY INTERPOLATED FROM THEIR NEIGHBOR BUCKETS

| 79 | ETC | 43 | 42 | 41 | 40 | 39 | 38 | 37 | 36 | ETC | 229 | 228 | 227 | 226 | 225 | 224 | 223 | 222 | ETC | 92 |
|---|---|---|---|---|---|---|---|---|---|---|---|---|---|---|---|---|---|---|---|---|

FOLDEDVAL
ARRAY 2: 360 BUCKETS: EVERY BUCKET CONTAINS THE POSITION (DEGREES) OF THE LOWER LAYER DIE THICKNESS FOR FOLDEDVAL: ARRAY 1

*Fig. 5*

BLOWN FILM SCANNING METHOD

CROSS-REFERENCE TO RELATED APPLICATION

This application claims priority from Provisional Patent Application Ser. No. 61/576,228, filed Dec. 15, 2011, entitled BLOWN FILM SCANNING METHOD, which is incorporated in its entirety herein.

FIELD OF THE INVENTION

This invention relates generally to tubular blown films and, more particularly, to methods for controlling the thickness profile of tubular blown films.

BACKGROUND OF THE INVENTION

Tubular blown films have become very popular methods of producing inexpensive plastic bags and plastic sheets made from single or multiple layer plastic polymer materials, such as polyethylene, polypropylene, polyamide, ethylene vinyl acetate, ethylene vinyl alcohol and ionomers.

Typically, a tubular blown film is produced by extruding the plastic film from a ring-shaped extruder. In some cases, the blown film may contain multiple layers of different polymers co-extruded into one multi-layer film, having a total thickness and discernable internal layer thicknesses. Because blown films are tubular in shape, controlling the thickness profile of the tubular blown film or of its constituent layers (as well as the profiles of other physical properties of the tubular blown film) is often done using measurements made on the bubble using backscatter sensors such as NDC Gamma, Capacitance and optical sensors.

Measurement on the bubble is typically conducted by backscatter sensors which are relatively inaccurate, and cannot make truly reliable constituent layer measurements. It would be preferable to use transmission sensors which are more accurate than backscatter sensors and can in some versions also offer excellent constituent layer measurements as well as total measurements. However, transmission sensors cannot be fitted on the bubble as one sensor head would have to remain inside the bubble and this is impossible to achieve in practice.

In most blown film lines, the tubular blown film is folded ("collapsed") after blowing, and measurements at each position on a collapsed film are possible using both backscatter and transmission technology. However, as two layers of film are always present at any given location, the problem of determining the measurement of the individual top and bottom layers must be solved.

Solution of this layer measurement problem would also give the possibility of a faster, more accurate measurements and provide the ability to accurately control the quality of the multilayer film.

Several prior art methods for controlling the thickness profile of the tubular blown film have attempted to control the thickness profile of the tubular blown film by using measurements made on the folded (double layer) film. The problem of measuring the folded blown film is that what is measured is the combined (double layer) thickness of two different sectors of the blown film. To effectively control the thickness profile of the blown film, it is necessary to determine the thickness of all (single layer) sectors around the circumference of the tubular blown film.

One prior art method of accomplishing this is to measure the combined thickness of the folded film only at the edges of the fold where the combined thickness of oppositely disposed sectors of the film can be assumed to be from the same sector. This method, however, requires fully rotating the blown film so that repeated measurements can be taken of each sector as each sector is rotated to the edges of the fold. This is time consuming, and can take 2 to 10 minutes, depending upon the speed of rotation of the blown film.

Another method of controlling the thickness profile of a tubular blown film is disclosed in European Patent EP 1 207 368 B1. In the method disclosed in this patent, the thickness of individual sectors of the blown film is estimated by a technique using the least squares method or weighted least squares method for solving hyper-constrained systems. The method described in this patent is also time consuming and requires about 10-20 scans of the folded film before thickness estimates of each sector can be calculated. Moreover, the resulting profile determination is merely an estimate of the true profile.

Accordingly, there is a need for a method for controlling the thickness profile of a tubular blown film which avoids the aforementioned problems in the prior art.

SUMMARY OF THE INVENTION

The invention satisfies this need. The invention is a method for measuring and controlling a cumulative physical property of a tubular blown film within predetermined control limits, wherein the tubular blown film has a longitudinal axis and a periphery, and is being extruded from a ring-shaped extruder having a plurality of film physical property controllers disposed sequentially around the ring-shaped extruder. The method comprises the following steps:

(a) identifying a plurality of n longitudinal sections of the blown film;

(b) collapsing the film on itself such that each of the longitudinal sections are made contiguous with an opposed longitudinal section so as to form a first set of about n/2 contiguous two layer pairings, each contiguous two layer pairing comprising the combination of a first longitudinal section of the blown film and an opposed second longitudinal section;

(c) measuring the physical property of each of the first set of contiguous two layer pairings, the physical property of each two layer pairing comprising the physical property of the first longitudinal section plus the physical property of the second longitudinal section;

(d) rotating the film such that each of the longitudinal sections are made contiguous with an opposed longitudinal section so as to form another set of n/2 contiguous two layer pairings with each contiguous two layer pairings comprising a first longitudinal section of the blown film and an opposed second longitudinal section, the set of contiguous two layer pairings formed in this step having different combinations of first and second longitudinal sections than in previously formed sets of contiguous two layer pairings;

(e) measuring the physical property of each contiguous two layer pairing formed in the immediately previous step, the physical property of each two layer pairing comprising the physical property of the first longitudinal section in the contiguous two layer pairing formed in the previous step, plus the physical property of the opposed second longitudinal section;

(f) repeating steps (d) and (e) a plurality of times;

(g) computing an initial estimate of the physical property for each longitudinal section of the blown film by calculating the sum of the measurements of each two layer pairing combination comprising each particular longitudinal section, and then dividing each such sum by twice the number of measurements;

(h) computing a new estimate of the physical property for each longitudinal section of the blown film by (I) subtracting from the sum of the measurements of each two-layer pairing combination comprising a particular longitudinal section the estimate of the physical property, derived in this step (h) or in step (g), for each opposed longitudinal section in two-layer pair combinations whose estimated physical property was measured in steps (c), (e) and (f) comprising the particular longitudinal section, and (II) dividing the result by the number of measurements;

(i) computing a new estimate of the physical property for each longitudinal section of the blown film by successive iterations of (I) subtracting from the sum of the measurements of each two-layer pairing combination comprising a particular longitudinal section the estimate of the physical property, derived in this iteration or in the immediately previous iteration, for each opposed longitudinal section in two-layer pair combinations whose estimated physical property was measured in steps (c), (e) and (f) comprising the particular longitudinal section, and (II) dividing the result by the number of measurements;

(j) repeating step (i) a plurality of times to yield a final estimate of the physical property for each longitudinal section of the blown film; and (k) (optionally) adjusting at least one film physical property controller to control the final estimate of the physical property of at least one longitudinal section to within the predetermined control limits.

DRAWINGS

These and other features, aspects and advantages of the present invention will become better understood with reference to the following description, appended claims and accompanying drawings where:

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

As stated above, the invention is a method for controlling a cumulative physical property of a tubular blown film within predetermined control limits, wherein the tubular blown film has a longitudinal axis and a periphery, and is being extruded from a ring-shaped extruder having a plurality of film physical property controllers disposed sequentially around the ring shaped extruder. The method comprises the following steps:

(a) identifying a plurality of n longitudinal sections of the blown film;

(b) collapsing the film on itself such that each of the longitudinal sections are made contiguous with an opposed longitudinal section so as to form a first set of about n/2 contiguous two layer pairings, each contiguous two layer pairing comprising the combination of a first longitudinal section of the blown film and an opposed second longitudinal section;

(c) measuring the physical property of each of the first set of contiguous two layer pairings, the physical property of each two layer pairing comprising the physical property of the first longitudinal section plus the physical property of the second longitudinal section;

(d) rotating the film such that each of the longitudinal sections are made contiguous with an opposed longitudinal section so as to form another set of n/2 contiguous two layer pairings with each contiguous two layer pairings comprising a first longitudinal section of the blown film and an opposed second longitudinal section, the set of contiguous two layer pairings formed in this step having different combinations of first and second longitudinal sections than in previously formed sets of contiguous two layer pairings;

(e) measuring the physical property of each contiguous two layer pairing formed in the immediately previous step, the physical property of each two layer pairing comprising the physical property of the first longitudinal section in the contiguous two layer pairing formed in the previous step, plus the physical property of the opposed second longitudinal section;

(f) repeating steps (d) and (e) a plurality of times;

(g) computing an initial estimate of the physical property for each longitudinal section of the blown film by calculating the sum of the measurements of each two layer pairing combination comprising each particular longitudinal section, and then dividing each such sum by twice the number of measurements;

(h) computing a new estimate of the physical property for each longitudinal section of the blown film by (I) subtracting from the sum of the measurements of each two-layer pairing combination comprising a particular longitudinal section the estimate of the physical property, derived in this step (h) or in step (g), for each opposed longitudinal section in two-layer pair combinations whose estimated physical property was measured in steps (c), (e) and (f) comprising the particular longitudinal section, and (II) dividing the result by the number of measurements;

(i) computing a new estimate of the physical property for each longitudinal section of the blown film by successive iterations of (I) subtracting from the sum of the measurements of each two-layer pairing combination comprising a particular longitudinal section the estimate of the physical property, derived in this iteration or in the immediately previous iteration, for each opposed longitudinal section in two-layer pair combinations whose estimated physical property was measured in steps (c), (e) and (f) comprising the particular longitudinal section, and (II) dividing the result by the number of measurements;

(j) repeating step (i) a plurality of times to yield a final estimate of the physical property for each longitudinal section of the blown film; and (k) (optionally) adjusting at least one film physical property controller to control the final estimate of the physical property of at least one longitudinal section to within the predetermined control limits.

The plurality of n longitudinal sections can be substantially of equal length when measured along the periphery of the film in a plane perpendicular to the longitudinal axis, or the plurality of n longitudinal sections can be of non-equal lengths.

The physical property can be any cumulative physical property. By "cumulative physical property," it is meant a physical property whose measured value when measured across two identical layers of the same film is double the value when measured across a single layer of the film. One example of such cumulative physical property is thickness.

The total number of measurements in steps (c), (e) and (f) is preferably at least two in number.

Typically, the iterations carried out in step (i) are performed by a digital computer and preferably number at least 50, more preferably at least 150, and most preferably at least 200 in number.

The method of the invention can be best understood by reference to the following description of an application of the method to create a circular thickness profile for a blown film collapsed bubble.

Figure 1:
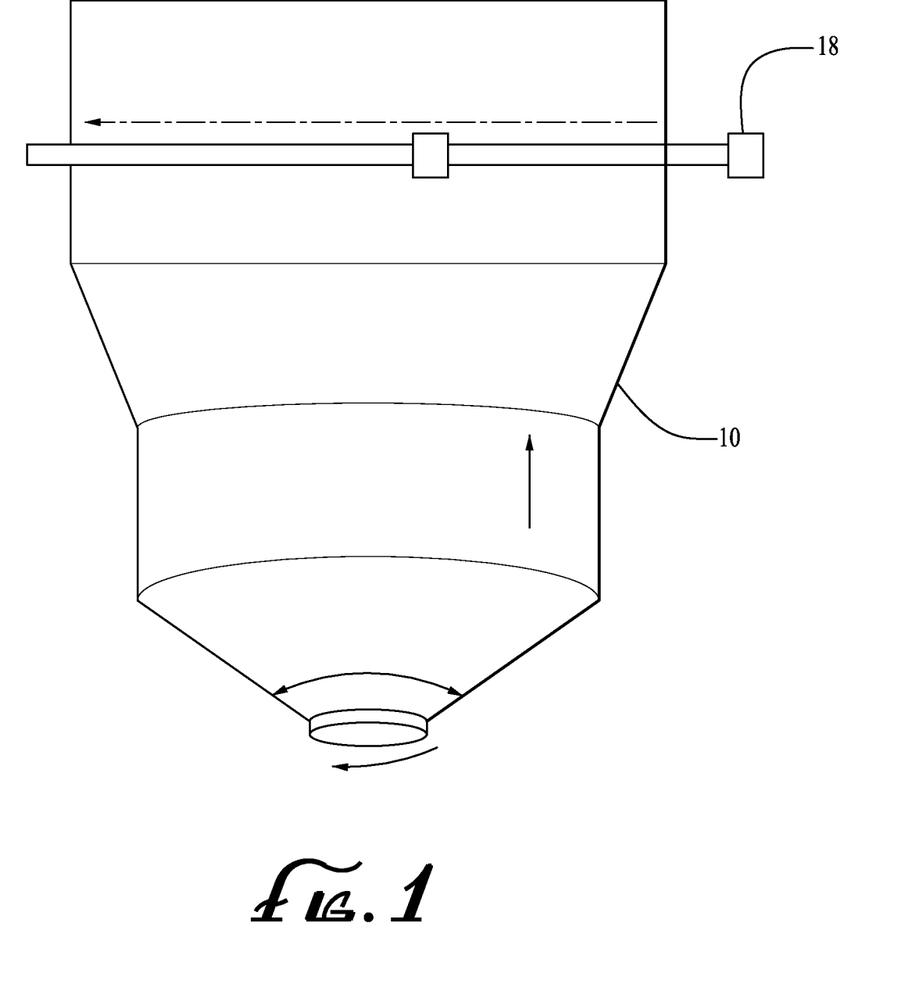
FIG. 1 is a perspective diagram showing the production of a tubular blown film by extruding plastic film from a ring-shaped extruder.
Figure 2:
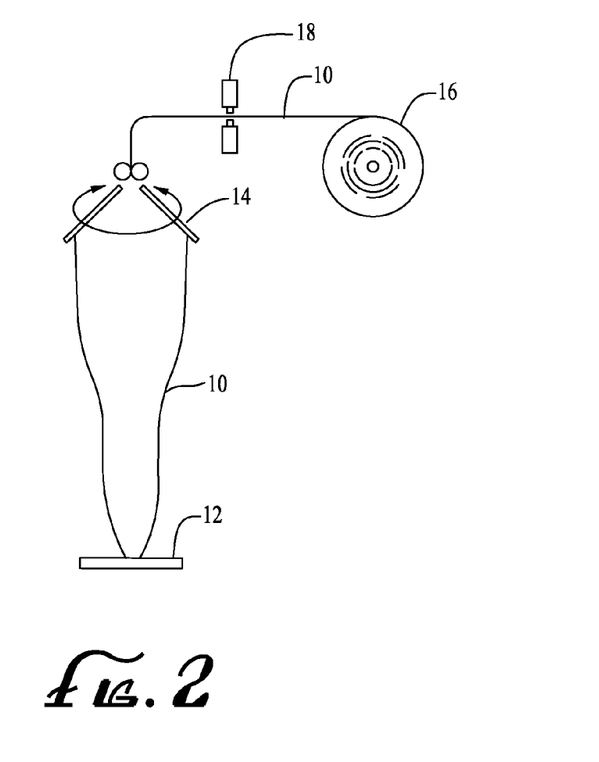
FIG. 2 is a side view illustrating the production of a blown film using an extruder similar to that which is illustrated in FIG. 1.

As shown in FIGS. 1 and 2, the blown plastic film 10 is extruded from an annular die 12. A mass of air at pressure inside the tube blows the tube into a bubble. The bubble is cooled and then formed into a doubled film by a collapsing frame 14. The resulting doubled film is wound up onto a roll 16. Almost all machines of this type oscillate or rotate either the die, or collapsing frame to laterally distribute the variations across the final roll.

Figure 3:
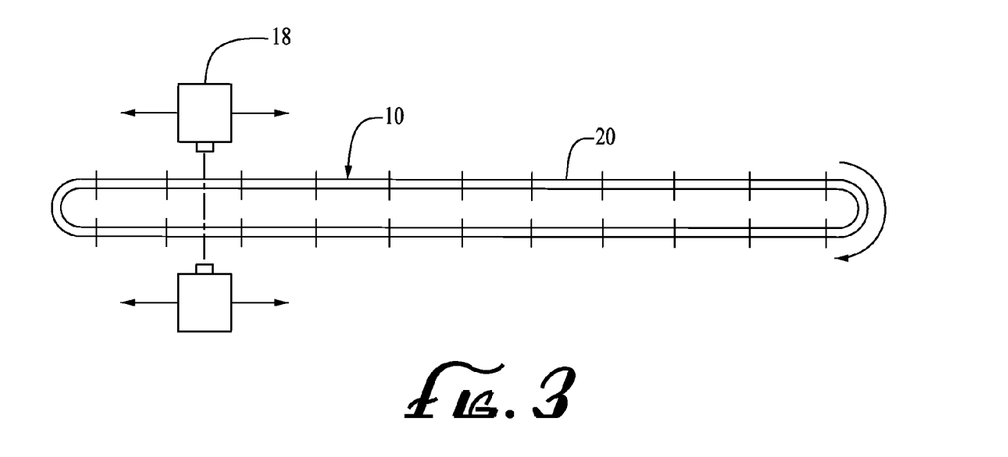
FIG. 3 is a side diagrammatic representation of the measuring of a physical property of a folded blown film.

A convenient way to measure the thickness of this product is to pass the collapsed bubble through a scanning mechanism 18 containing a thickness measurement device which could be an infra red gauge, beta gauge, or some other kind of mass/thickness measurement. The method of the invention is used to determine a 360° profile measurement from the scanned double profile. As shown in FIG. 3, thickness measurements are made at each section 20 along the collapsed, doubled film.

In the present example, the folded film is separated into a single 360° bucket array representing product from die position 0° to 360°.

While a scanner scans the double bubble and gathers folded gage profiles, the web edge positions are accurately tracked as well as web speed and angular position of rotating mechanism known in the prior art. The software must continuously determine characteristics of the blown film termed scanner angle, die angle and profile angle.

The scanner angle is the distance between the left web edge and the data position normalized so that the range between left and right web edges spans 0° to 180°. The scanner angle for the left web edge (top) layer is 0°; the right edge is 179°. The left web edge (bottom) layer is 359°, and the right edge is 180°.

The die angle is the angle on the die from which product currently at the left scanner web edge was produced. E.g. the left web edge is composed of material from the die at 0° when product from the die at 0° reaches the left web edge at the scanner.

The basic measurement of the die angle is dimensioned in degrees. However, for control purposes it is often more convenient to express the angle in some other units, e.g. diebolts.

For a die with N equal bolt zones:
Die Angle=0° at the boundary of bolt 1 and bolt N
Die Angle=359° for the last point on bolt N The Profile Angle=Scanner angle+Die Angle. The profile angle arises as the machine rotates or oscillates, the bubble rotates and changes the die angle. That is, when product from the die at position 20°, reaches the left web edge, the left web edge top/bottom layers are at 2019°. The right edge top/bottom layers are at 199°/200°.

If the machine did not rotate, the top and bottom films measured during the scan (from edge to edge) would span exactly 180°. The machine rotates while the scanner makes its scan. If, for example, the die rotates +10° while the scanner scanned +180°, the top film spans 190° and the bottom film spans 170°.

The foregoing discussion works well in applications where the collapsed film rotates steadily at the same rate of rotation as the die. Most frequently, however, the collapsed film tends to be separated from the die by twists in the blown film. This occurs mostly between the point where the bubble is blown, and the collapsing frame. Therefore, it is important to take into account such twists.

In practice, the bubble length changes during a machine run due to the variation of the amount of air in the bubble. As time passes, air leaks out of the bubble, and from time to time the bubble is recharged.

A pragmatic way of compensating for changing bubble height is to assume that bubble twist is proportional to bubble height. Thus, bubble twist can be estimated by entering the steady state bubble twist and bubble radius, and let the system estimate the change in bubble length by continuing to measure the bubble radius. The bubble radius is measured by the scanner.

The following algorithm uses the change in bubble radius to compensate the twist for estimated changes in bubble height.

In the following algorithm:
bblRad: Bubble radius
prmBblRad: Bubble radius entered at calibration time
bblLen: Bubble length
volCyl: Volume of air in the bubble (cylinder)
ssTwist: Steady state bubble twist (°)
prmSsTwist: Bubble twist entered at calibration time
Based on the standard equation for a cylinder:
volCyl=II*bblRad$^2$*bblLen;
bblLen=volCyl/(II*bblRad$^2$);
bblRad=sqrt(volCyl/(II*bblLen));
so
volCyl α bblLen
volCyl α sqrt(bblRad)
Assuming that all dimensions x, y, z change in proportion . . .

bblLen α sqrt(bblRad)
bblLen=K*sqrt(bblRad)
ssTwist α bblLen
ssTwist α sqrt(bblRad)
ssTwist=K*sqrt(bblRad)
At calibration time: when prmBblRad and prmBblTwist are entered:—
K=1
K=prmSsTwist/sqrt(prmBblRad)
and
ssTwist=prmSsTwist*sqrt(bblRad)/sqrt(prmBblRad)
ssTwist=prmSsTwist*sqrt(bblRad/prmBblRad)

In some systems, the die oscillates its rotation—alternatively turning clockwise, counterclockwise. When the oscillating die (or guide roll system) changes direction, the bubble twist value goes through a transition.

Figure 4:
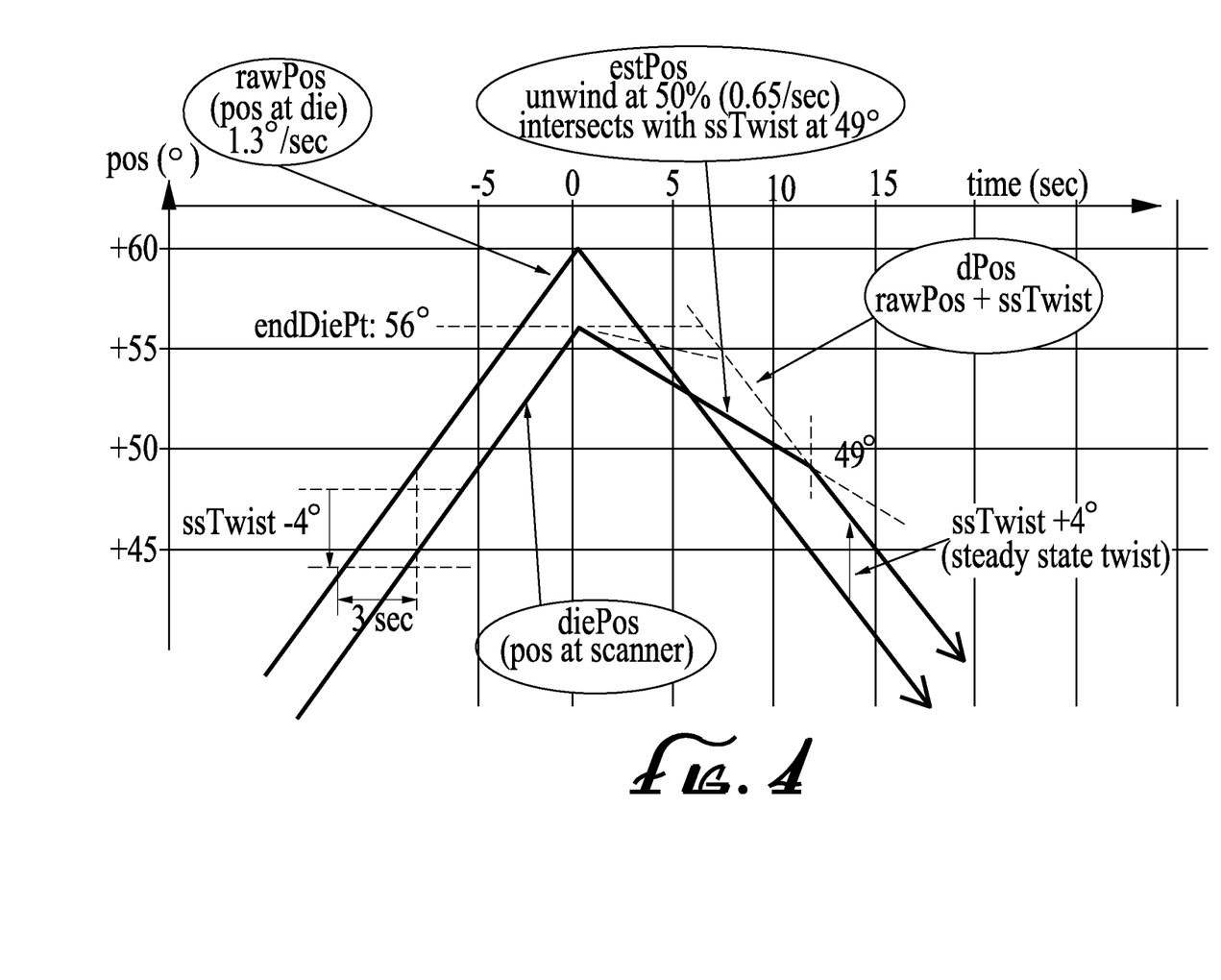
FIG. 4 is a graph illustrating a method of monitoring web edge positions in a blown film to which the invention is applied.

It has been observed that the bubble changes direction at the scanner at the same time as the Die. As illustrated in FIG.

4, this can be modeled this by having diePos reverse at a % of the rotation speed until the die position at the scanner intersects with the steady state twist of the reverse sweep.

The parameter to calibrate this is ROT END SPD (%). It is defined as the percentage of rotSpd speed that the bubble retraces at end of cycle. until the steady state twist for the new direction is reached, as follows:
on fwd pass
diePos=rawPos−ssTwist;
at end of cycle
endDiePt=startPos+degreesOfOsc−ssTwist;    (wrapped at 360°)
on reverse pass
estPos=endDiePt−(tSinceEnd*rotSpd*rotEndSpdPct/100)
dPos=rawPos+ssTwist;
intersection
if (dPos<estpos)
diePos=dPos;
else
diePos=estPos;
Twist calculation
twist=diePos−rawPos;

One special case for this is where the die (or collapsing frame) rotates, and the system includes Automatic Profile Control. For this case the Automatic Pulse Lineup APC function can calibrate the die position using APC feedback, and the bubble twist model is not needed.

The gauge profile contains a data array which represents the gage readings taken during a scan. This array has 180 buckets. each bucket contains data for 1° of arc.

Another array in the gauge profile structure defines (for each bucket) the current (top layer) die angle at the left web edge. The die angle is scaled in degrees.

As the die angle at the left web edge moves, the left web edge die position and scan angle are tracked. This is done by writing the current die angle into the second array as readings are taken.

Such tracking allows calculation of the absolute die position of top and bottom layers for each measurement position in the scan profile.

At every end-of-scan the gauge profile is used to generate the "folded profile." The following discussion of the calculations used in the present example employs the following defined terms:

bblVal[bkt] A product thickness issued from position bkt (°) at the Die foldedVal[bkt] A gauge measurement comprising the sum of a top and bottom layer Scanner angle: As explained above, the scanner angle is the distance between the left web edge and the data position normalized to that the range between left and right web edges spans 0° to 180°. For example, the scanner angle for the left web edge (top) layer is 0°, the right edge is 179°. The left web edge (bottom) layer is 359°, and the right edge is 180°.

Die Angle: Also as explained above, the Die Angle is the angle on the Die from which the product currently at the left web edge was produced. For example, the left web edge is composed of material from the die at 0° when product from the die at 0° reaches the left edge fold.

avProf: An estimate of the deconvolved die thickness profile newAvgProf: A buffer for holding the new estimated thickness profile.

ownBkt: The foldedProd array contains 360 elements. Each bucket represents 1° of data from the die. The 0th element holds data from 0° on the die. The data in foldedProf is the sum of 2 gauge readings. ownBkt, and oppBkt.

oppBkt is the other bucket in the folded sum. E.g. if the scanner is 10° from the left web edge, and the die position at the left web edge is 5°, the reading at the gauge is the sum of 2 positions. One reading (the top layer) is at 15°, the other, (the bottom layer), is at 354°. The next scanner profile bucket will be the sum of readings at 16° (the top layer), and 353° (the bottom layer). In foldedProf, the reading array at bucket 15 will contain the sum of the die thicknesses at 15°, and 354°. The oppBkt array will contain the number 354. This allows us to access the die position of the other layer.

Figure 5:
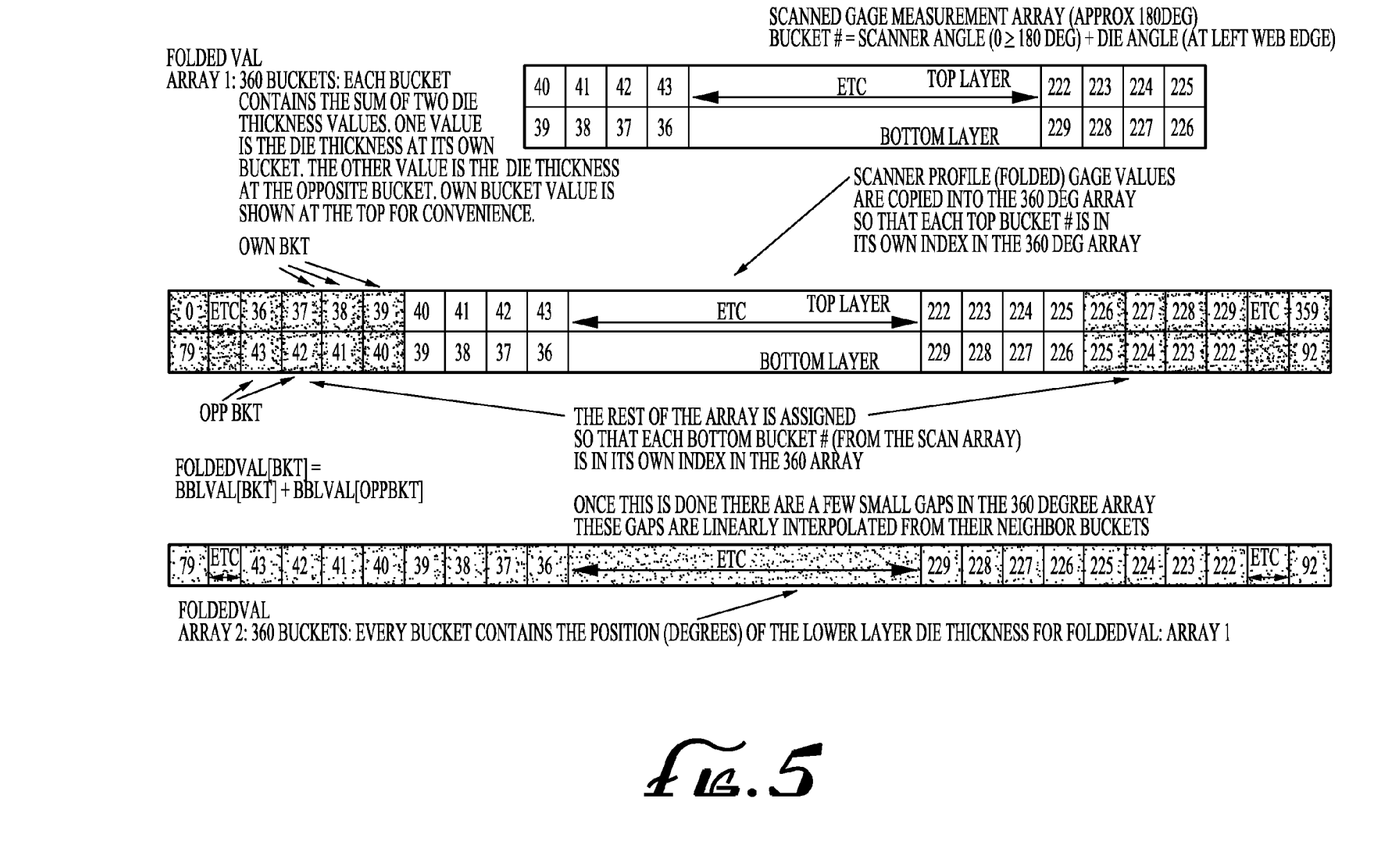
FIG. 5 is a diagram illustrating several steps of the method of the invention.

In the present example, calculating the foldedVal profile is accomplished as follows:

The gauge profile is processed so that the (top layer) values are moved

The (approx) 180° gauge profile in part of a 360 bucket profile (foldedVal) is placed so that the top layer buckets are in the correct position.

Note: although the gauge array covers scanner angles from 0° to 179°, the actual die position is scanner angle+die angle, so if the die angle=40° at start scan and 46° at the end of scan, the foldedVal profile will be populated from 40 to 225.

FIG. 5 illustrates this step.

Next, the rest of the 360° profile is populated so that the bucket values from the Gauge Profile are put in the array in the bottom bucket indexes in the 360° profile. For example, bucket 40 contains the sum of readings at 40 and 39, so assign bucket 39 with the value from bucket 40. The small gaps are filled in by linear neighbor interpolation wherever they occur.

The foldedVal profile structure also contains another 360 bucket array. This is assigned the indexes of the opposite layer bucket for each bucket. The foldedVal data is now ready to process into an accurate reconstruction of the bubble profile.

Note: A push down stack of 8 consecutive foldedVal profiles is assumed in this example.

Next, the first rough approximation of the bubble profile is calculated.

The gauge reading for each bucket in the foldedVal profile is given by:
foldedVal[ownBkt]=bblVal[ownBkt]+bblVal[oppBkt];

Each array value is a gauge reading. (The sum of 2 layers from the collapsed bubble.)

One layer is the product thickness at the array index.

e.g. for bucket index 40, (ownBkt), the layer value is the product thickness from the die at 40°.

The other layer is from another position on the die.

The algorithm keeps track of the die position (oppBkt), of the other layer.

N (e.g. 4) consecutive foldedVal profiles are taken and sum each bucket, the result is the profile
sumProf:
for each bkt:
sumProf[bkt]=foldedVal1[bkt]+foldedVal2[bkt]+foldedVal3[bkt]+foldedVal4[bkt]

Assuming that scan time is short (<20 sec), and die profile change between consecutive profiles is small enough to be ignored. i.e. bblVal[bkt] for the 4 consecutive profiles are equal It can be said:
sumProf[bkt]≈(4*bblVal[ownBkt])+bblVal[oppBkt1]+ bblVal[oppBkt2]+bblVal[oppBkt3]+bblVal[oppBkt4];
where oppBktN is retrieved from the relevant historical foldedProf.

Each bucket in this profile contains the sum of 8 layers.

4 layers are product thickness at the die position (array index). The other 4 layers are from other (known) positions on the die. The profile is weighted in favor of ownBkt by N (4) times more than any single oppBkt value Next, each bucket in sumProf is divided by N*2 (for example, 8)

avProf[bkt]=sumProf[bkt]/8;

Each bucket in avProf contains the average of 8 layers. 4 layers are product thickness at the die position (bkt). the other 4 layers are product thickness from known different positions on the die. The bucket value is influenced more by the 4 array index values which are all from the same die position, than the other 4 layers. avProf is the first approximation to the unfolded profile.

Next the bubble profile is refined by successive optimization. This Process successively optimizes bblProfApprox[] to reduce errors to insignificance. avProf contains estimates for product thickness at each position in the array. It can be calculated to a more accurate approximation by using sumProf and bblProfApprox since:

sumProf[bkt]≈(4*avProf[bkt])+avProf[oppBkt1]+avProf[oppBkt2]+avProf[oppBkt3]+avProf[oppBkt4];

A new, more accurate thickness profile can be calculated as follows:

newAvProf[bkt]≈(sumProf[bkt]−avProf[oppBkt1]−avProf1[oppBkt2]−avProf[oppBkt3]−avProf[oppBkt4])/4;

By copying newAvProf[] to avProf[] and repeating the previous process a more accurate value for newAvgProf[] is calculated.

This can be repeated until the profile converges.

In practice, 200 passes and N=4 profiles gives a very accurate bubble profile. The time taken for a pass of this approximation is insignificant with today's computers

Having thus described the invention, it should be apparent that numerous structural modifications and adaptations may be resorted to without departing from the scope and fair meaning of the instant invention as set forth hereinabove and as described herein below by the claims.

What is claimed is:

1. A method for controlling a cumulative physical property of a tubular blown film within predetermined control limits, the tubular blown film having a longitudinal axis and a periphery and being extruded from a ring-shaped extruder having a plurality of film physical property controllers disposed sequentially around the ring-shaped extruder, the method comprising the following steps:

(a) identifying a plurality of n longitudinal sections of the blown film;

(b) collapsing the film on itself such that each of the longitudinal sections are made contiguous with an opposed longitudinal section so as to form a first set of about n/2 contiguous two layer pairings, each contiguous two layer pairing comprising the combination of a first longitudinal section of the blown film and an opposed second longitudinal section;

(c) measuring the physical property of each of the first set of contiguous two layer pairings, the physical property of each two layer pairing comprising the physical property of the first longitudinal section plus the physical property of the second longitudinal section;

(d) rotating the film such that each of the longitudinal sections are made contiguous with an opposed longitudinal section so as to form another set of n/2 contiguous two layer pairings with each contiguous two layer pairings comprising a first longitudinal section of the blown film and an opposed second longitudinal section, the set of contiguous two layer pairings formed in this step having different combinations of first and second longitudinal sections than in previously formed sets of contiguous two layer pairings;

(e) measuring the physical property of each contiguous two layer pairing formed in the immediately previous step, the physical property of each two layer pairing comprising the physical property of the first longitudinal section in the contiguous two layer pairing formed in the previous step, plus the physical property of the opposed second longitudinal section;

(f) repeating steps (d) and (e) a plurality of times;

(g) computing an initial estimate of the physical property for each longitudinal section of the blown film by calculating the sum of the measurements of each two layer pairing combination comprising each particular longitudinal section, and then dividing each such sum by twice the number of measurements;

(h) computing a new estimate of the physical property for each longitudinal section of the blown film by (I) subtracting from the sum of the measurements of each two-layer pairing combination comprising a particular longitudinal section the estimate of the physical property, derived in this step (h) or in step (g), for each opposed longitudinal section in two-layer pair combinations whose estimated physical property was measured in steps (c), (e) and (f) comprising the particular longitudinal section, and (II) dividing the result by the number of measurements;

(i) computing a new estimate of the physical property for each longitudinal section of the blown film by successive iterations of (I) subtracting from the sum of the measurements of each two-layer pairing combination comprising a particular longitudinal section the estimate of the physical property, derived in this iteration or in the immediately previous iteration, for each opposed longitudinal section in two-layer pair combinations whose estimated physical property was measured in steps (c), (e) and (f) comprising the particular longitudinal section, and (II) dividing the result by the number of measurements;

(j) repeating step (i) a plurality of times to yield a final estimate of the physical property for each longitudinal section of the blown film; and (k) adjusting at least one film physical property controller to control the final estimate of the physical property of at least one longitudinal section to within the predetermined control limits.

2. The method of claim 1 wherein the plurality of n longitudinal sections are of equal length when measured along the periphery of the film in a plane perpendicular to the longitudinal axis.

3. The method of claim 1 wherein the computing of a new estimate of the physical property for each longitudinal section of the blown film in step (i) is made by successive iterations of (I) subtracting from the sum of the measurements of each two layer pairing combination comprising a particular longitudinal section the estimate of the physical property derived in the immediately previous iteration for each opposed longitudinal section in two-layer pair combinations whose estimated physical property was measured in steps (c), (e) and (f) comprising the particular longitudinal section, and (II) dividing the result by the number of measurements.

4. The method of claim 1 wherein the physical property is thickness.

5. The method of claim 1 wherein the number of measurements in step (c), (e) and (f) is at least two in number.

6. The method of claim 1 wherein the number of iterations carried out in step (i) number at least 50 in number.

7. The method of claim 1 wherein the number of iterations carried out in step (i) number at least 100 in number.

8. The method of claim 1 wherein the number of iterations carried out in step (i) number at least 200 in number.

9. The method of claim 1 wherein the number of multilayer films is between two and four.

10. The method of claim 1 wherein the extruder rotates during the method.

11. The method of claim 1 wherein the extruder oscillates during the method.

12. A method for measuring a cumulative physical property of a tubular blown film within predetermined control limits, the tubular blown film having a longitudinal axis and a periphery and being extruded from a ring-shaped extruder having a plurality of film physical property controllers disposed sequentially around the ring-shaped extruder, the method comprising the following steps:
  (a) identifying a plurality of n longitudinal sections of the blown film;
  (b) collapsing the film on itself such that each of the longitudinal sections are made contiguous with an opposed longitudinal section so as to form a first set of about n/2 contiguous two layer pairings, each contiguous two layer pairing comprising the combination of a first longitudinal section of the blown film and an opposed second longitudinal section;
  (c) measuring the physical property of each of the first set of contiguous two layer pairings, the physical property of each two layer pairing comprising the physical property of the first longitudinal section plus the physical property of the second longitudinal section;
  (d) rotating the film such that each of the longitudinal sections are made contiguous with an opposed longitudinal section so as to form another set of n/2 contiguous two layer pairings with each contiguous two layer pairings comprising a first longitudinal section of the blown film and an opposed second longitudinal section, the set of contiguous two layer pairings formed in this step having different combinations of first and second longitudinal sections than in previously formed sets of contiguous two layer pairings;
  (e) measuring the physical property of each contiguous two layer pairing formed in the immediately previous step, the physical property of each two layer pairing comprising the physical property of the first longitudinal section in the contiguous two layer pairing formed in the previous step, plus the physical property of the opposed second longitudinal section;
  (f) repeating steps (d) and (e) a plurality of times;
  (g) computing an initial estimate of the physical property for each longitudinal section of the blown film by calculating the sum of the measurements of each two layer pairing combination comprising each particular longitudinal section, and then dividing each such sum by twice the number of measurements;
  (h) computing a new estimate of the physical property for each longitudinal section of the blown film by (I) subtracting from the sum of the measurements of each two-layer pairing combination comprising a particular longitudinal section the estimate of the physical property, derived in this step (h) or in step (g), for each opposed longitudinal section in two-layer pair combinations whose estimated physical property was measured in steps (c), (e) and (f) comprising the particular longitudinal section, and (II) dividing the result by the number of measurements;
  (i) computing a new estimate of the physical property for each longitudinal section of the blown film by successive iterations of (I) subtracting from the sum of the measurements of each two-layer pairing combination comprising a particular longitudinal section the estimate of the physical property, derived in this iteration or in the immediately previous iteration, for each opposed longitudinal section in two-layer pair combinations whose estimated physical property was measured in steps (c), (e) and (f) comprising the particular longitudinal section, and (II) dividing the result by the number of measurements; and
  (j) repeating step (i) a plurality of times to yield a final estimate of the physical property for each longitudinal section of the blown film.

13. The method of claim 12 wherein the plurality of n longitudinal sections are of equal length when measured along the periphery of the film in a plane perpendicular to the longitudinal axis.

14. The method of claim 12 wherein the computing of a new estimate of the physical property for each longitudinal section of the blown film in step (i) is made by successive iterations of (I) subtracting from the sum of the measurements of each two layer pairing combination comprising a particular longitudinal section the estimate of the physical property derived in the immediately previous iteration for each opposed longitudinal section in two-layer pair combinations whose estimated physical property was measured in steps (c), (e) and (f) comprising the particular longitudinal section, and (II) dividing the result by the number of measurements.

15. The method of claim 12 wherein the physical property is thickness.

16. The method of claim 12 wherein the number of iterations carried out in step (i) number at least 50 in number.

17. The method of claim 12 wherein the number of multilayer films is between two and four.

18. The method of claim 12 wherein the extruder rotates during the method.

19. The method of claim 12 wherein the extruder oscillates during the method.

* * * * *